M. M. LOORAM.
RECEPTACLE.
APPLICATION FILED OCT. 27, 1914.
1,213,116. Patented Jan. 16, 1917.
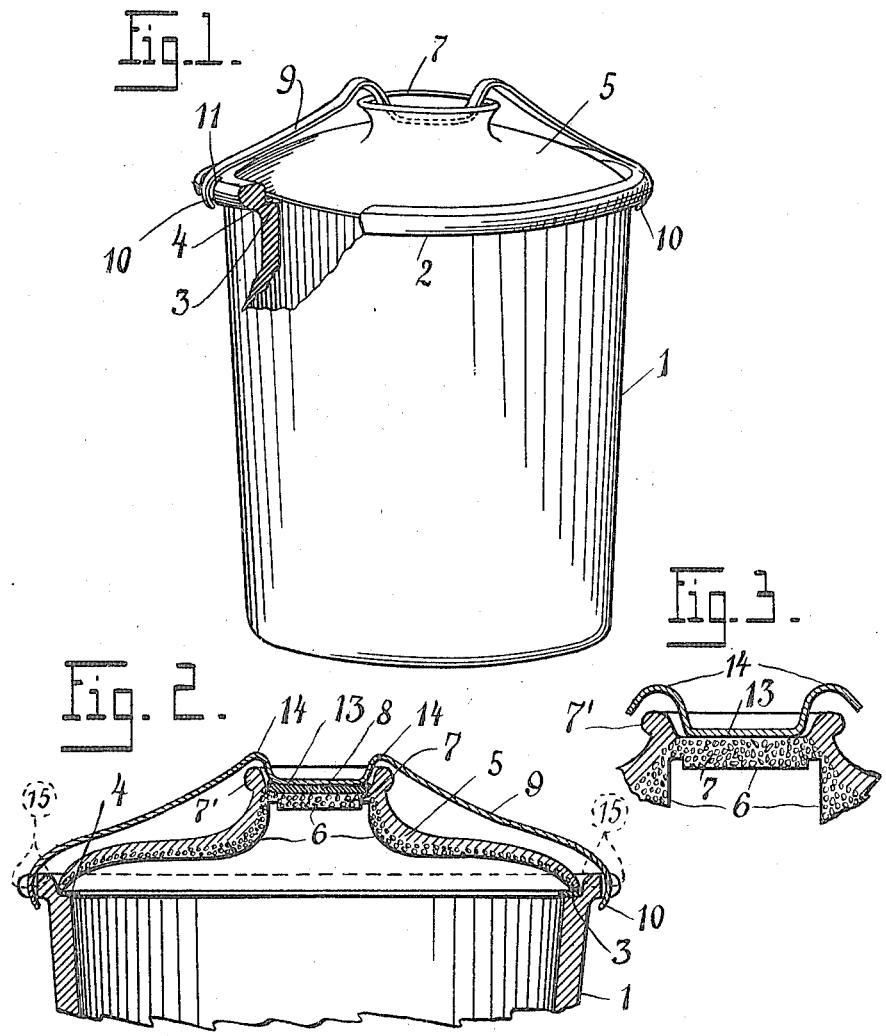
WITNESSES:
INVENTOR
Matthew Michael Looram
BY
Felix Stern
ATTORNEY

UNITED STATES PATENT OFFICE.

MATTHEW MICHAEL LOORAM, OF NEW YORK, N. Y.

RECEPTACLE.

1,213,116.    Specification of Letters Patent.    Patented Jan. 16, 1917.

Application filed October 27, 1914. Serial No. 868,864.

*To all whom it may concern:*

Be it known that I, MATTHEW MICHAEL LOORAM, a citizen of the United States, residing at 50 Broad street, New York city, in the county and State of New York, have invented new and useful Improvements in Receptacles, of which the following is a specification.

This invention relates to improvements in receptacles, and particularly to receptacles which serve for maintaining the contents either in unaltered condition or which are adapted to maintain the contents of the receptacles continuously in suitable condition for preservation by subjecting the same in the closed receptacle to the influence of moisture.

A large number of receptacles is known serving the purpose of hermetically sealing the contents against air. Receptacles of this kind are in general use for the preservation of food stuff. It is essential for permanent preservation of food stuffs that oxygen or other chemical elements or compounds should be excluded from the interior of the receptacle; for this purpose the receptacle is made either of metal or of some other non-porous material, or of some porous material, the pores of which have been closed in some suitable way. The application of glazing or an enamel to the outer surface will result in the closure of the pores of the material, which otherwise might admit air or other gases or fluids into the receptacle.

For the preservation of other substances again, it is of great advantage to maintain the same in a moist condition without either keeping these substances in an entirely open receptacle or without immersing the same partly or completely in a liquid. For the proper preservation of tobacco, for instance, it is essential to admit a certain amount of moisture and to maintain the humidity of the space in which it is preserved at a certain percentage.

An object of the present invention is to provide a receptacle which may be used for keeping food stuff or other substances hermetically sealed, and which may also be used for maintaining the contents of the receptacle in moist condition. Receptacles are known which comply with either one or the other of the above conditions. I believe it to be novel to provide receptacles which comply with both of the above conditions.

Another object of the invention is to provide a receptacle with a closing member, said closing member being adapted to receive means which will prevent the entrance of air and moisture into the receptacle, said closing member being also adapted to permit exudation of moist air and to act as a vent.

Another object of the invention is to provide a means which will effectively close the pores of the wall of the receptacle, and a member for securing the means for closing the pores and for securing the closure of the receptacle in position.

Another object of the invention is to provide a seal which, although adapted to close the pores of a receptacle, will not adhere permanently to the walls of the receptacle, and which, therefore, may readily be removed to reconvert the receptacle into one with open pores.

Another object of the invention is to provide a hermetic seal which, by its application to the receptacle, will not disturb the flavor or fragrance of the contents of the same.

With these and other objects in view, I have illustrated an embodiment of the invention in the accompanying drawing in which:

Figure 1 is a side elevation of a receptacle, with the cover in place. Fig. 2 is a sectional view of a portion of the receptacle or of the cover of the same, showing the porous portion of the wall and the means for confining a seal in position with respect to the porous portion, and Fig. 3 shows, on an enlarged scale, the means for securing the cover in place when the receptacle is to be used as a humidor or the like.

The receptacle comprises a jar and a cover. The jar 1 is open at the top, and is provided with an outstanding, circumferential flange 2, near the top edge. In the embodiment illustrated, the entire outer surface of this jar may be glazed or provided with some other suitable coating which closes the pores of the material. It is obvious that this portion of the jar may also be made of an entirely non-porous material. The heat resisting qualities of earthen ware, china, porcelain and the like, make it advisable to make this portion of the receptacle of such material, although it is obvious that metal may be used if desired, or that glass may be used if the contents of the receptacle do not suffer by exposure to the light.

The inner wall of the receptacle has, near the top edge, an inwardly projecting shoulder, or ledge, 3, which serves as a support for a suitable packing ring, 4, made of asbestos or the like.

The jar may be closed by a cover, 5, which may be made of porous material, and may be provided with a coating to close the pores on the outer surface. From Figs. 2 and 3 it will be seen that the inner surface of said cover is made of porous material, as shown at 6, while the outer surface is glazed, or provided with another coating to render it non-porous. The central portion of the cover, however, as shown at 7, is porous throughout, the glazing being omitted on this portion on the outer surface. The cover, therefore, may consist of a material having different porosity on certain portions and uniform porosity on other portions. The portion of uniform porosity will serve for permitting the exudation of moisture from the contents of the receptacle and will also act as a vent for the same.

It is advisable that certain substances, like tobacco, should be kept continually in moist condition. The porous portion of the cover may be saturated with water and will absorb the same. The exudation of this moisture absorbed in the porous parts will be prevented by the glazed outer portion of the cover, and will only take place through the central portion of the cover, which is of uniform porosity, between the two surfaces.

If it is desired to use the receptacle for the preservation of substances which should not be exposed to the influence of moisture, the porous portion, 7, is also covered by a non-porous seal, 8, preferably of light, flexible material. Parchment paper or paraffined paper is the material preferably used for this purpose, because paper which has been rendered non-porous by a coat of other substances, as for instance, gum, may, on account of these coating substances, influence the contents of the jar and destroy or change the flavor of said contents. The flange, 7', surrounding the portion 7 and being non-porous, will also serve as a retaining means for the seal, 8, and will prevent displacement of the same with respect to the portion 7, of uniform porosity, of the cover.

The cover may be held against its seat by some suitable locking means adapted to exert a pressure on the cover and to force the same against the packing ring. For this purpose a detachable bail, 9, preferably of resilient material, is shown in Figs. 1, 2, and 3. This bail is provided at both of its ends with inwardly projecting tongues, 10, adapted to engage the lower face of the circumferential flange, 2, whereby the cover is forcibly held against the packing ring, 4, as soon as the bail is applied. A displacement of the locking means or bail, 10, in circumferential direction may be prevented by forcing the two ends of the same into recesses, 11, on diametrically opposite points of the flange, 2. The center portion of the bail or locking means is utilized at the same time for forcing the seal 8, which serves as a hermetical closure, against the portion 7, of uniform porosity. On the other hand, the seal between the porous portion 7 of the receptacle and the bail will serve as a cushion for the bail and will prevent excessive pressure of this locking means against this porous portion. It is evident, therefore, that a receptacle is provided, having means for utilizing the same as a humidor or as a hermetically closed receptacle, and having means for forcing a closure on the receptacle proper, and means for preventing the exertion of excessive pressure by the locking means on the receptacle. The insertion of a cushion between the bail and the receptacle is of great value for various reasons. The pressure exerted by the locking means against the receptacle is strongest at the center portion, and a breakage of the receptacle might, therefore, occur at the center portion of the same, which breakage will be prevented by the insertion of a cushion between these elements. Receptacles of this kind even if made of breakable material, can, therefore, be shipped or packed without exercising the great care which ordinarily is necessary for shipping or packing articles of this kind.

The center portion, 13, of the locking means is depressed, whereby, adjacent to said center portion, upstanding, offset portions, 14, are formed, which after the application of the locking means, overlie the retaining flange. This depression at the center portion, 13, of the locking means, increases the resiliency of the bail, and has the advantage that, owing to these offset portions, deformations in the other portions of the locking means will remain without any detrimental effect on the center portion.

The yielding contact of the locking means with the notched portions of the flange may be enhanced by placing short annular members, 15, of asbestos or other inodorous non-conductive material, over those portions of the locking means which enter into the notches.

I claim:

A receptacle comprising in combination with a jar of non-porous material, a cover resting on the top of the jar, said cover consisting of porous material, the pores of which are closed on the outer surface, with the exception of a central portion on the cover on which the pores extend through the entire thickness of the material of the cover; an annular flange surrounding said central porous portion, a non-porous seal detachably placed on said central porous portion and surrounded by said annular flange, and a holding bail extending from the jar over said flange into engagement with the detachable seal for forcing the seal against the cover and for forcing the cover against the jar.

MATTHEW MICHAEL LOORAM.

Witnesses:
JOHN L. KANE,
A. N. BIDDLE.

Copies of this patent may be obtained for five cents each, by addressing the "Commissioner of Patents, Washington, D C."